Nov. 21, 1961 W. E. P. JOHNSON 3,009,682
GAS TURBINES

Filed April 25, 1952 2 Sheets-Sheet 1

Inventor
William E. P. Johnson
By
Attorneys

Nov. 21, 1961   W. E. P. JOHNSON   3,009,682
GAS TURBINES

Filed April 25, 1952   2 Sheets-Sheet 2

Inventor
William E. P. Johnson
By Stevens, Davis, Miller & Mosher
his Attorneys

United States Patent Office 3,009,682
Patented Nov. 21, 1961

3,009,682
GAS TURBINES
William E. P. Johnson, Hampstead, London, England, assignor to Power Jets (Research & Development) Limited, London, England, a British company
Filed Apr. 25, 1952, Ser. No. 284,399
Claims priority, application Great Britain May 16, 1951
9 Claims. (Cl. 253—39.15)

This invention relates to gas turbine arrangements.

It can be shown from theoretical considerations that in any gas turbine plant the thermal efficiency is proportional to the pressure ratio and to the temperature ratio. That is, the efficiency can be raised by raising the maximum combustion or turbine inlet temperature relative to a constant intake temperature. It was the difficulty of raising the turbine inlet temperature which prevented many early attempts to build gas turbine plant from being successful. Materials have since become available which will withstand high stresses at high temperature but still there is an upper limit at about 800° C. Many solutions of this problem have been sought and many proposals have been made for cooling the turbine rotor blades. Some of these proposals have been for very complicated arrangements and the fact that they have been seriously considered at all is evidence of the pressing nature of the problem. It will be appreciated that could the blades which are subjected to high stresses in the path of the hot gases leaving the heating system and the stationary structure in the vicinity be satisfactorily cooled, much higher gas working temperatures could be employed.

The present invention provides a gas turbine arrangement having upstream of the turbine rotor blades liquid coolant injecting means operable to introduce said coolant on to the region of the leading edges of the blades whereby in operation the temperature of the latter is substantially reduced.

There is also provided a gas turbine arrangement having upstream of the turbine rotor blades liquid coolant injecting means operable to inject said coolant in a direction initially transversely to the median of the gas flow, the latter deflecting the coolant on to the region of the leading edges of the blades which are thereby substantially reduced in temperature.

The invention further provides a gas turbine arrangement having stator nozzle guide vanes upstream of the turbine rotor blades, which guide vanes have internal passages for the flow of liquid coolant therethrough, and a plurality of which vane passages have each a connection to an orifice in the trailing edge of the respective vane through which coolant is ejected on to the region of the leading edge of the turbine blades which are thereby substantially reduced in temperature.

Water may be used as the liquid coolant or, alternatively, the cooling may be effected by the injection of liquid fuel. In the latter case means may be provided downstream of the turbine for burning the resultant combustible mixture.

The invention will be described, by way of example only, with reference to certain embodiments thereof shown in the accompanying diagrammatic drawings in which.

Figure 1:
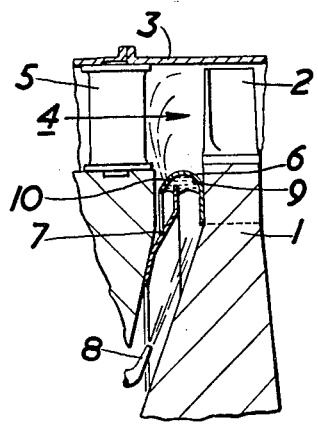
FIGURE 1 shows an inverted annular trough method of introducing liquid coolant upstream of the turbine blading and FIGURE 2 shows a part front view of the same arrangement.

It will be clear that the distance between the nozzle blading and the turbine blading as shown in FIGURE 1 is exaggerated for the purpose of indicating more clearly the construction of the trough and its associated baffles which make the carrying out of this embodiment of the invention possible.

Referring first to FIGURE 1 there will be seen a turbine rotor 1 carrying blades such as 2 within a housing or outer casing indicated at 3. The gas flow is in the direction of the arrow 4 and it passes the nozzle guide vanes 5 before reaching the turbine blades. On the front face of the rotor, and at its rim there is mounted an inverted annular trough shown in section at 6. A baffle 7 is mounted on the stationary structure supporting the nozzle blading.

When the turbine is in operation liquid coolant is introduced on to the front face of the turbine disc, for instance via nozzles 8 and this coolant by centrifugal action is trapped within the trough 6 in such a way as to form a liquid annulus 9. It will be clear that this liquid annulus forms a seal preventing the working fluid leaking via the space between the trough 6 and the baffle 7 towards the rotor shaft.

A number of holes or inlets 10 are spaced around the periphery of the trough 6 (as will more clearly be seen from FIGURE 2) and the coolant from the annular seal is forced as a number of jets through these holes. For each turbine blade 2 there may be provided a hole 10 so that an equal number of jets of liquid coolant are introduced into the working fluid as there are turbine blades. The jets are deflected and carried back by the flow on to the upstream region of the turbine blades. On the other hand however it may be found that a lesser number of jets will be sufficient. Experimental results have tended to show that a few jets, which introduce a fair quantity of coolant each, are preferable to a larger number of fine jets. It appears that when the jets become so fine as to be atomised in the gas stream then the temperature reduction of the turbine blades is much less marked.

It will be clear from the arrangement described above not only is turbine blade cooling effected but the rotor disc is also cooled.

Figure 2:
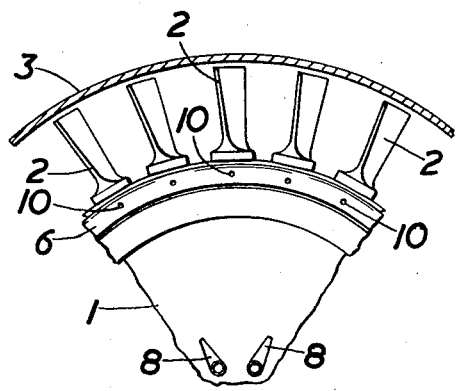
Figure 3:
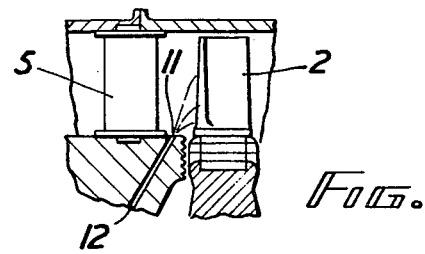
FIGURE 3 shows a method of injecting coolant transversely to the gas flow immediately upstream of the turbine blades.

In FIGURE 3 the trough arrangement shown in FIGURES 1 and 2 is dispensed with and the liquid coolant is injected from a number of orifices 11 (which need not be circular) spaced around the internal wall of the gas duct downstream and adjacent the root of the nozzle guide vanes 5. The coolant is supplied under pressure through the conduits 12 to the orifices. On leaving the latter it is injected transversely to the median of the gas flow which deflects the coolant jet and carries it on to the region of the leading edge of the turbine blades 2.

Figure 4:
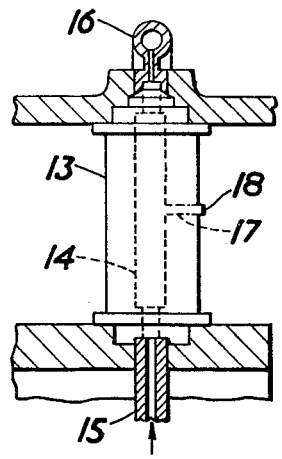
FIGURE 4 shows a nozzle guide vane with an internal cooling passage which is also arranged to eject coolant in the downstream direction.

In the arrangement shown in FIGURE 4 the nozzle guide vanes 13 all have internal passages 14 through which liquid coolant flows. It enters under pressure through pipes such as 15, passes through the cooling passage and out into a collecting ring 16. Two or more of the nozzle guide vanes have connections 17 from the internal cooling passage to orifices such as 18 in the trailing edge. These provide, as it were, a leak from the nozzle guide vane cooling system and liquid coolant enters the gas stream and passes on to the region of the leading edges of the turbine rotor blades (not shown in this figure) which are thereby reduced in temperature. It may be found preferable for obtaining more even temperature reduction to have the orifices in the guide vanes so equipped at different radial stations.

Figure 5:
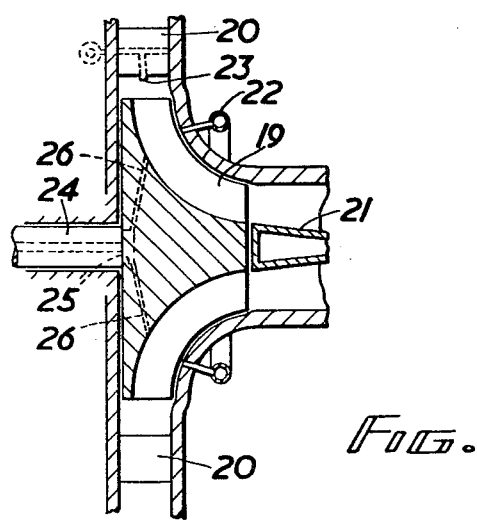
FIGURE 5 shows a radial inward flow turbine embodiment of the invention.

In FIGURE 5 is shown a radial inward flow turbine. The blades are shown at 19 and the gas stream enters past the nozzle guide vanes 20 leaving by the duct 21. In this instance, it is proposed to inject the liquid coolant from the ring 22 at a number of selected peripherally-spaced points in the outer duct defining wall into the region of the upstream end of the blades 19. The liquid coolant there vaporises and lowers the temperature of the turbine blades. Two alternative injecting arrangements are also shown in this figure. More than one of these three injecting arrangements may be used at the same time if so desired. A number of the nozzle guide vanes 20 may be equipped with liquid coolant injecting nozzles 23 in their trailing edges. Coolant emerging from them is carried by the gas stream into the turbine. All the nozzle guide vanes may be internally cooled in a manner similar to that arrangement shown in FIGURE 4. Also shown dotted is a passage for liquid coolant through the hollow shaft 24. From the collecting cavity 25 a number of conduits 26 take liquid coolant to the upstream ends of the turbine blades 19. Any one of these three arrangements introduces liquid coolant at the upstream end and thereby lowers the temperature of the blades.

Where the liquid coolant used is fuel, it is proposed that after-burning equipment should be incorporated downstream of the turbine blades so that further thrust augmentation of the working fluid is effected. Where such additions are not desirable water may provide an effective liquid coolant.

It may not always be convenient to provide a continuous injection of coolant in any of the manners set out above but such arrangements will still find considerable use for boosting the normal output of the turbine. Boosting will be achieved by simultaneously increasing the fuel flow to the main combustion system and effecting the reduction in turbine blade temperature made possible by the invention.

The invention is applicable to both axial and radial flow turbines.

What I claim is:

1. A gas turbine arrangement having stationary structure, a rotor body associated with said structure, an annular working fluid passage, the inner and outer walls thereof being defined by said stationary structure and said rotor body, a ring of blades on said rotor body projecting into said fluid passage and having leading and trailing edges, means defining a plurality of inlets communicating with said passage and directed towards one of said passage walls, said inlets being upstream and spaced apart from the blades, means including said means defining said inlets for supplying liquid coolant through said inlets into the passage in the form of jets in a direction initially transverse to the direction of the working fluid flow in said working fluid passage, said jets subsequently being deflected by the fluid flow to a direction transverse to the edges of the blades and to subsequently impinge on the blades upstream of the trailing edges thereof.

2. A gas turbine arrangement having a casing, a rotor body within said casing, together forming structure defining inner and outer walls of a centripetal flow working fluid passage, a ring of blades on said rotor body projecting into said working fluid passage, means defining a plurality of inlets communicating with said passage and directed towards one of said passage walls, and means including said means defining said inlets for supplying liquid coolant through said inlets into the passage in the form of jets in a direction initially transverse to the direction of the working fluid flow in said working fluid passage, said jets subsequently being deflected by the fluid flow to subsequently impinge on the blades upstream of the trailing edges thereof.

3. A gas turbine arrangement as claimed in claim 2 in which said inlets extend through the rotor body.

4. A gas turbine arrangement having an outer casing, a rotor body within said casing, a ring of blades on said rotor body having leading and trailing edges, stationary structure extending upstream of said blades, an axial flow annular working fluid passage, the inner and outer walls thereof being defined respectively by the rotor body together with the stationary structure and the outer casing, said blades projecting into said working fluid passage, said inner wall having circumferentially spaced inlets extending therethrough, said inlets being spaced upstream and apart from said blades and communicating with said passage and directed towards the outer wall thereof, and means including said means defining said inlets for supplying liquid coolant through said inlets into the passage in the form of jets in a direction initially transverse to the direction of the working fluid flow in said working fluid passage, said jets subsequently being deflected by the fluid flow to a direction transverse to the leading edge of the blades and to subsequently impinge on the blades upstream of the trailing edges thereof.

5. A gas turbine as claimed in claim 4 in which the inlets extend through the stationary structure.

6. A gas turbine arrangement having an outer casing, a rotor body within said casing, a ring of blades on said rotor body having leading and trailing edges, stationary structure extending upstream of said blades, an axial flow annular working fluid passage, the inner and outer walls thereof being defined respectively by the rotor body together with the stationary structure and the outer casing, said blades projecting into said working fluid passage, an annular trough mounted on the upstream side of said rotor body, the concave face of said trough being directed towards the rotational axis of said rotor, said trough having circumferentially spaced inlets extending therethrough disposed around and in the peripheral surface of said trough, said inlets being spaced apart and upstream from said blades and communicating with said passage and directed towards the outer wall thereof, and means for supplying liquid coolant to said inlets so as to form jets of liquid coolant in said working fluid passage in a direction initially transverse to the direction of working fluid flow in said working fluid passage, said jets subsequently being deflected by the fluid flow to a direction transverse to the leading edge of the blades and to subsequently impinge on the blades upstream of the trailing edges thereof, said means for supplying liquid coolant comprising a plurality of nozzles spaced radially around the rotational axis of said rotor body at the upstream side of said rotor body, said nozzles being positioned at a smaller radial distance from the rotational axis of said rotor body than said trough and being directed towards the concave face of said annular trough, said coolant being passed across the upstream face of said rotor body to be temporarily trapped in said trough.

7. A gas turbine arrangement having an outer casing, a rotor body within said casing, a ring of blades on said rotor body having leading and trailing edges, stationary structure extending upstream of said blades, an annular working fluid passage, the inner and outer walls thereof being defined respectively by said rotor body together with said stationary structure and said outer casing, said blades projecting into said working fluid passage, an annular trough mounted on the upstream side of said rotor body, the concave face of said trough being directed towards the rotational axis, said trough having circumferentially spaced inlets disposed around and in its peripheral surface, means for supplying liquid coolant to said inlets, said last named means comprising circumferentially spaced nozzles spaced radially around the rotational axis of said rotor body at the upstream side of said rotor body, said nozzles being positioned at a smaller radial distance from the rotational axis of said rotor body than said trough and being directed towards the concave face of said trough to supply the trough in operation with liquid coolant, said coolant being passed across the upstream face of the rotor to be temporarily trapped in the trough and to be injected by centrifugal action into the working fluid passage through said inlets, and an annular baffle mounted at one end on said stationary structure and having its other end projecting into a part of the annular trough which in operation contains said trapped liquid coolant, the baffle co-operating with the trapped liquid in said annular trough to form a seal against radial leakage of working gas.

8. A method of cooling a row of gas turbine rotor blades comprising the steps of injecting a jet of coolant liquid into the working fluid stream entering said row, arranging said jet to be in a direction initially transverse to the direction of the working fluid stream, spacing said coolant jet upstream of said blades at its point of entry into the working fluid stream and deflecting said coolant by the stream of working fluid into a downstream direction to impinge in liquid form directly on said blades.

9. A method of cooling a row of gas turbine rotor blades comprising the steps of injecting a jet of coolant liquid into the working fluid stream entering said row, arranging said jet to be in a direction initially transverse to the direction of the working fluid stream, spacing said coolant jet upstream of said blades at its point of entry into the working fluid stream and deflecting said coolant by the stream of working fluid into a downstream direction to impinge in liquid form directly on the leading edges of said blades.

References Cited in the file of this patent

UNITED STATES PATENTS

| | | |
|---|---|---|
| 1,805,093 | Holzwarth | May 12, 1931 |
| 1,824,893 | Holzwarth | Sept. 29, 1931 |
| 2,364,189 | Buchi | Dec. 5, 1944 |
| 2,401,826 | Halford | June 11, 1946 |
| 2,406,473 | Palmatier | Aug. 27, 1946 |
| 2,479,777 | Price | Aug. 23, 1949 |
| 2,506,581 | Cowles | May 9, 1950 |
| 2,549,819 | Kane | Apr. 24, 1951 |
| 2,598,176 | Johnstone | May 27, 1952 |
| 2,606,044 | Allen | Aug. 5, 1952 |
| 2,606,741 | Howard | Aug. 12, 1952 |
| 2,647,368 | Triebbnigg | Aug. 4, 1953 |
| 2,684,831 | Grantham | July 27, 1954 |

FOREIGN PATENTS

| | | |
|---|---|---|
| 133,518 | Australia | July 14, 1949 |
| 211,115 | Great Britain | Apr. 3, 1924 |
| 383,506 | Germany | Oct. 13, 1923 |
| 452,412 | Great Britain | Aug. 24, 1936 |
| 680,581 | Great Britain | Oct. 8, 1952 |
| 781,057 | France | Feb. 18, 1935 |